US012027907B2

(12) United States Patent
Terry

(10) Patent No.: US 12,027,907 B2
(45) Date of Patent: Jul. 2, 2024

(54) COMPUTER CASE WITH INDUCTIVE WIRELESS CHARGING PAD

(71) Applicant: Colton James Terry, Henderson, NV (US)

(72) Inventor: Colton James Terry, Henderson, NV (US)

(*) Notice: Subject to any disclaimer, the term of this patent is extended or adjusted under 35 U.S.C. 154(b) by 519 days.

(21) Appl. No.: 17/301,250

(22) Filed: Mar. 30, 2021

(65) Prior Publication Data

US 2022/0109319 A1 Apr. 7, 2022

Related U.S. Application Data

(60) Provisional application No. 63/088,650, filed on Oct. 7, 2020.

(51) Int. Cl.
| | |
|---|---|
| *H02J 7/00* | (2006.01) |
| *G06F 1/16* | (2006.01) |
| *H01F 38/14* | (2006.01) |
| *H02J 7/02* | (2016.01) |
| *H02J 50/00* | (2016.01) |
| *H02J 50/10* | (2016.01) |

(52) U.S. Cl.
CPC .............. *H02J 7/02* (2013.01); *G06F 1/1616* (2013.01); *G06F 1/1632* (2013.01); *H01F 38/14* (2013.01); *H02J 7/0045* (2013.01); *H02J 50/005* (2020.01); *H02J 50/10* (2016.02)

(58) Field of Classification Search
USPC .......................... 320/106, 107, 108, 109, 110
See application file for complete search history.

(56) References Cited

U.S. PATENT DOCUMENTS

| | | |
|---|---|---|
| 6,870,089 B1 | 3/2005 | Gray |
| 8,080,975 B2 | 12/2011 | Bessa et al. |
| 8,432,124 B2 | 4/2013 | Foster |
| 9,331,519 B2 | 5/2016 | Lin et al. |
| D795,237 S | 8/2017 | Jung et al. |
| 10,008,870 B2 | 6/2018 | Davison et al. |

(Continued)

FOREIGN PATENT DOCUMENTS

CN 107154678 A * 9/2017 ......... G06F 3/03543

*Primary Examiner* — Brian Ngo
(74) *Attorney, Agent, or Firm* — Dunlap Bennett & Ludwig, PLLC

(57) ABSTRACT

The computer case wireless charging apparatus enables charging wirelessly-chargeable external devices using a laptop battery, and includes a computer housing having a notebook computer, a notebook computer battery and USB ports; and a charging pad device connected to the computer housing. The charging pad device includes a charging pad housing enclosing an inductive charging coil. A small PCB is operably connected to the inductive charging coil, the notebook computer battery and the USB ports of the notebook computer. An optional soft outer protective sleeve may retain the computer housing. Portions of the apparatus may be made of materials including plastic, polylactic acid (PLA), silicon and combinations thereof. The inductive charging coil may be made of copper. The charging pad housing includes at least one charging surface for charging wirelessly-chargeable devices. The notebook computer housing may include a charging area constructed and arranged for receiving and retaining the charging pad housing.

9 Claims, 9 Drawing Sheets

(56) References Cited

U.S. PATENT DOCUMENTS

| | | | |
|---|---|---|---|
| 10,164,461 B2 | 12/2018 | Wu et al. | |
| 10,211,871 B2 | 2/2019 | Noori et al. | |
| 10,840,727 B1 | 11/2020 | Subero | |
| 2005/0140331 A1 | 6/2005 | McQuade | |
| 2006/0273757 A1 | 12/2006 | Naguib | |
| 2011/0175567 A1* | 7/2011 | Kidakarn | H02J 50/005 |
| | | | 320/108 |
| 2011/0260674 A1 | 10/2011 | Dai | |
| 2014/0021909 A1 | 1/2014 | Klawon et al. | |
| 2014/0029195 A1 | 1/2014 | Barnes | |
| 2016/0094078 A1 | 3/2016 | Graham et al. | |
| 2016/0134142 A1* | 5/2016 | Murphy | H02J 50/10 |
| | | | 455/573 |
| 2016/0156217 A1 | 6/2016 | Pitts | |
| 2016/0380463 A1* | 12/2016 | Dow | H02J 50/40 |
| | | | 320/108 |
| 2016/0380465 A1* | 12/2016 | Dow | H02J 50/10 |
| | | | 320/108 |
| 2017/0170859 A1* | 6/2017 | Noori | H04B 5/0031 |
| 2017/0373518 A1 | 12/2017 | Hadnett | |
| 2018/0083464 A1 | 3/2018 | Jones, Jr. et al. | |
| 2018/0323636 A1 | 11/2018 | Makwinski et al. | |
| 2019/0036363 A1* | 1/2019 | Gaskin | H02J 7/0044 |
| 2020/0059110 A1* | 2/2020 | Pan | H02J 50/90 |
| 2021/0288687 A1* | 9/2021 | Novak | A45C 15/00 |
| 2022/0216731 A1* | 7/2022 | Hall | H02J 50/10 |

* cited by examiner

COMPUTER CASE WITH INDUCTIVE WIRELESS CHARGING PAD

CROSS-REFERENCE TO RELATED APPLICATION

This application claims the benefit of priority of U.S. Provisional Application No. 63/088,650, filed Oct. 7, 2020, the contents of which are incorporated herein by reference.

BACKGROUND OF THE INVENTION

The present invention relates to computer equipment, and more particularly to a laptop or notebook computer case fit with or incorporating an inductive wireless charging pad for charging mobile devices and any device which may be wirelessly charged.

No effective solution exists for conveniently and effectively charging wirelessly-rechargeable devices.

No laptop or notebook computer device exists which includes a wireless charging pad, or provides the ability for the battery thereof to be used to charge other devices. When a computer user wants to portably charge from a notebook or laptop computer, the user needs devices with wires and plug-ins to charge mobile devices.

Moreover, existing wireless or inductive charging devices in this field lack convenience and innovation.

A need exists for a device which enables a user to charge any device capable of being wirelessly charged, to be charged through the battery of a laptop or notebook computer. A need exists for an apparatus which includes a charging device capable of eliminating the need for all external cords. A need exists for an apparatus which is capable of directly connecting through existing (USB 2,3,C) receptacles of notebook or laptop computer or other device to draw power for charging wireless devices thereon.

SUMMARY OF THE INVENTION

Advantageously, in one aspect, the present invention provides a laptop or notebook computer case apparatus comprising an inductive wireless charging pad for mobile devices and any device which may be wirelessly charged, and a method for its use.

In one aspect, the present invention provides a computer case wireless charging apparatus capable of charging multiple wirelessly-chargeable external devices. The apparatus includes a computer housing having a notebook computer, a notebook computer battery and USB ports; and a charging pad device connected to the computer housing. The charging pad device includes a charging pad housing and an inductive charging coil therewithin. A small PCB is operably connected to the inductive charging coil, to the notebook computer battery and to the USB ports of the notebook computer. An optional soft outer protective sleeve may retain the computer housing. Portions of the apparatus may be made of material including plastic, polylactic acid (PLA), silicon and combinations thereof. The inductive charging coil may be made of copper. The charging pad housing includes at least one charging surface for charging any wirelessly-chargeable device. The notebook computer housing may include a charging area constructed and arranged to receive and retain the charging pad housing.

In one aspect, the apparatus of the present invention provides a portable solution which enables a user to charge any device capable of being wirelessly charged, to be charged through the battery of a laptop or notebook computer. The apparatus includes a charging device capable of eliminating the need for all external cords, which is capable of directly connecting through existing (USB 2,3,C) receptacles of notebook or laptop computer or other device to draw power for charging wireless devices thereon.

In one aspect the apparatus of the present invention comprises a laptop computer case which includes a wireless charging pad capable of charging one or more suitable devices, such as, for example without limitation, wireless charging devices; phone, wireless earbuds, or the like.

In a further aspect, the present invention provides a laptop case fit with inductive wireless charging pad for charging mobile devices.

In one aspect, the present invention provides a laptop or notebook computer case comprising a wireless charging pad. The computer case of the present invention is capable of use to charge any wirelessly chargeable device, such as, for example without limitation, wireless phone, wireless earbuds, or the like. The present invention is an unprecedented improvement over existing laptop cases or chassis and provides an apparatus comprising a laptop or notebook computer case and a convenient wireless charger, built into the computer case, that enables use of a laptop or notebook computer battery to charge any wirelessly chargeable device.

These and other features, aspects and advantages of the present invention will become better understood with reference to the following drawings, description and claims.

BRIEF DESCRIPTION OF THE DRAWINGS

The preferred embodiment of the claimed subject matter will hereinafter be described in conjunction with the appended drawings provided to illustrate and not to limit the scope of the claimed subject matter, where like designations denote like elements, and in which:

It is to be understood that like reference numerals refer to like parts throughout the several views of the drawings.

DETAILED DESCRIPTION OF THE INVENTION

Figure 1:
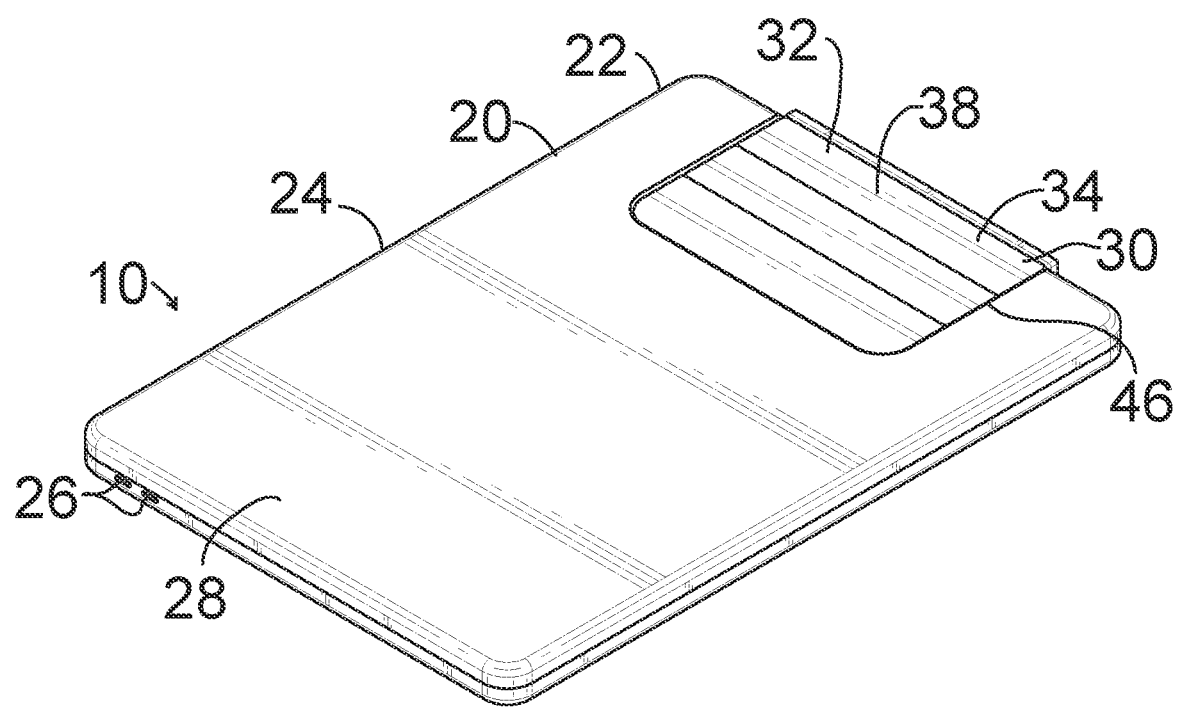
FIG. 1 is a perspective view of the invention.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

As used herein, "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, as there is no intention to be bound by any express or implied theory presented in the preceding technical field, background, brief summary or the following detailed description, it is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Broadly, one embodiment of the present invention provides a computer case wireless charging apparatus capable of charging multiple wirelessly-chargeable external devices.

In an exemplary embodiment, the apparatus includes a computer housing having a notebook computer, a notebook computer battery and USB ports; and a charging pad device connected to the computer housing. The charging pad device includes a charging pad housing and an inductive charging coil therewithin. A small printed circuit board (PCB) is operably connected to the inductive charging coil, to the notebook computer battery and to the USB ports of the notebook computer. An optional soft outer protective sleeve may retain the computer housing. Portions of the apparatus may be made of material including plastic, polylactic acid (PLA), silicon and combinations thereof. The inductive charging coil may be made of copper. The charging pad housing includes at least one charging surface for charging any wirelessly-chargeable device. The notebook computer housing may include a charging area constructed and arranged to receive and retain the charging pad housing.

The apparatus of the present invention provides a laptop or notebook computer charging case which solves the problem of not being able to charge a phone or other wireless device through the use of a laptop battery. The apparatus provides a laptop or notebook computer case with a convenient wireless charger built into the computer case, which enables use of a laptop or notebook computer battery to charge any wirelessly-chargeable device.

The apparatus of the present invention provides an unprecedented solution with an apparatus comprising a laptop case with an integral wireless charging pad capable of charging any wireless device. The apparatus eliminates the need for all external cords by directly connecting through USB 2,3,C of any suitable laptop or notebook computer to draw power for the charging pad.

Figure 2:
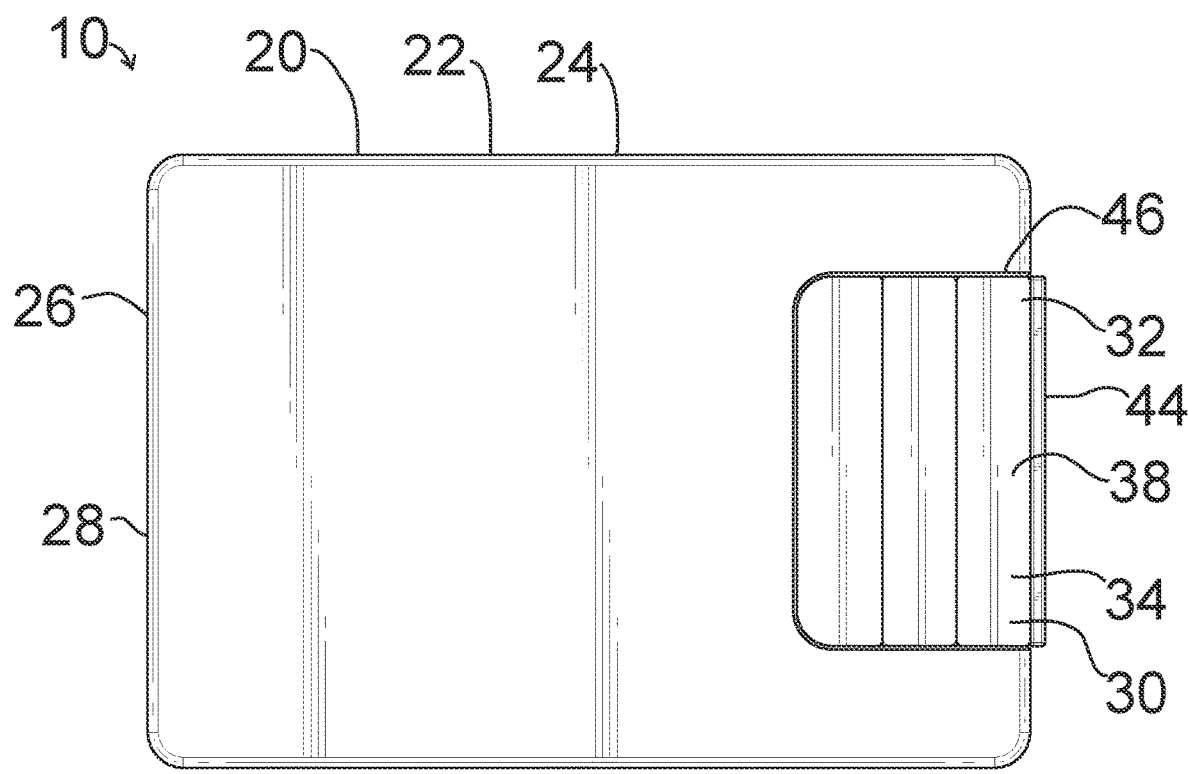
FIG. 2 is a top plan view of the invention.
Figure 3:
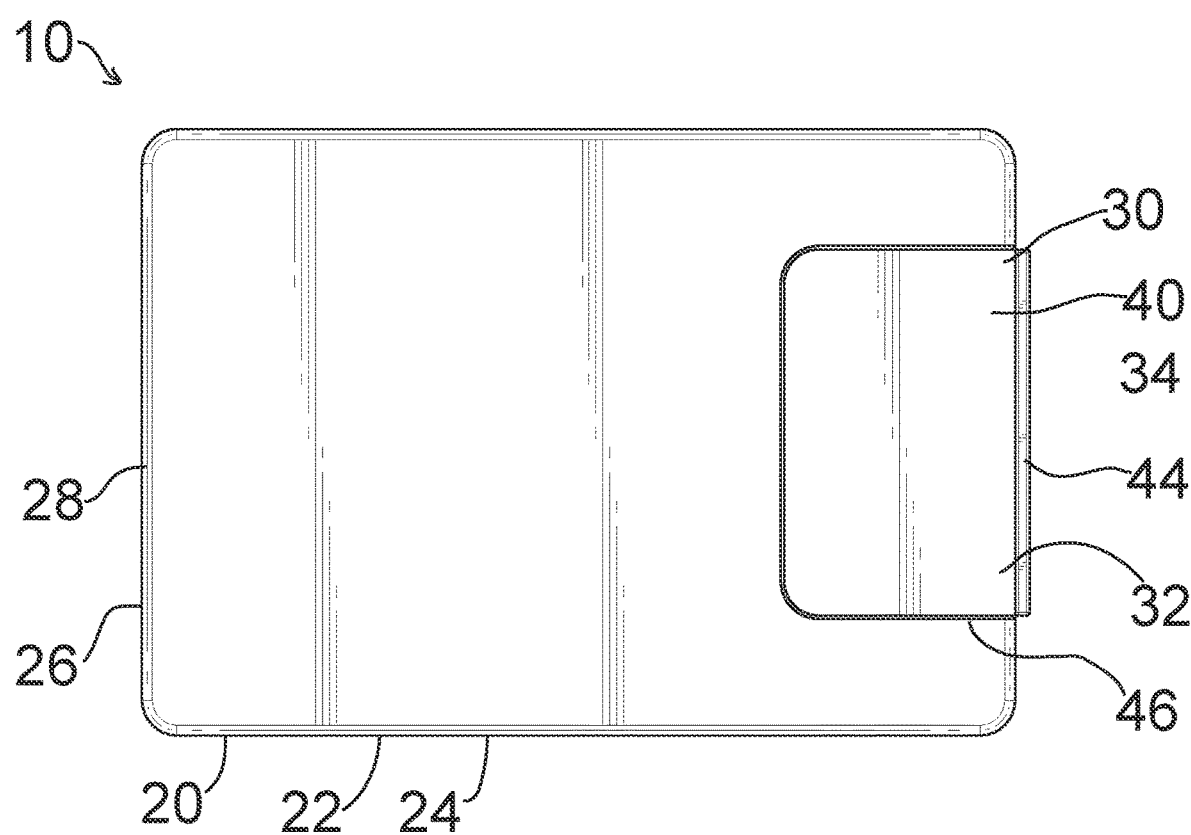
FIG. 3 is a bottom plan view of the invention.
Figure 4:
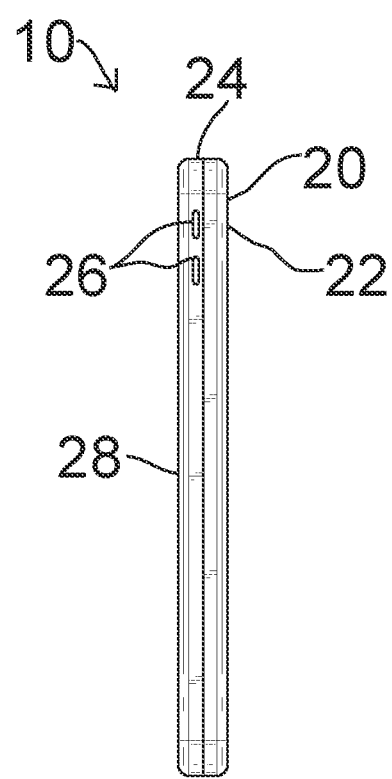
FIG. 4 is a left side view of the invention.
Figure 5:
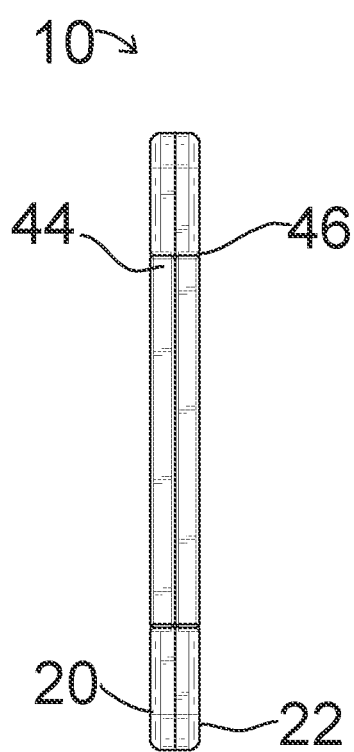
FIG. 5 is a right side view of the invention.
Figure 6:
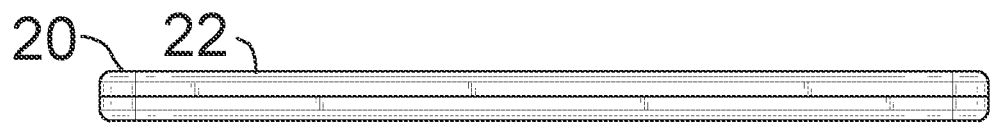
FIG. 6 is a front view of the invention.
Figure 7:
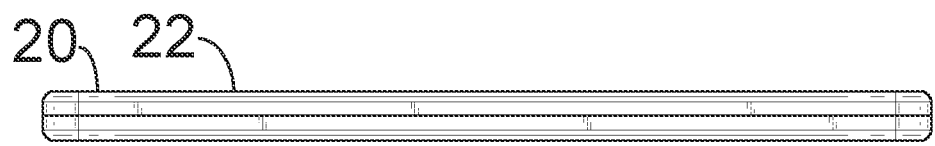
FIG. 7 is a rear view of the invention.
Figure 8:
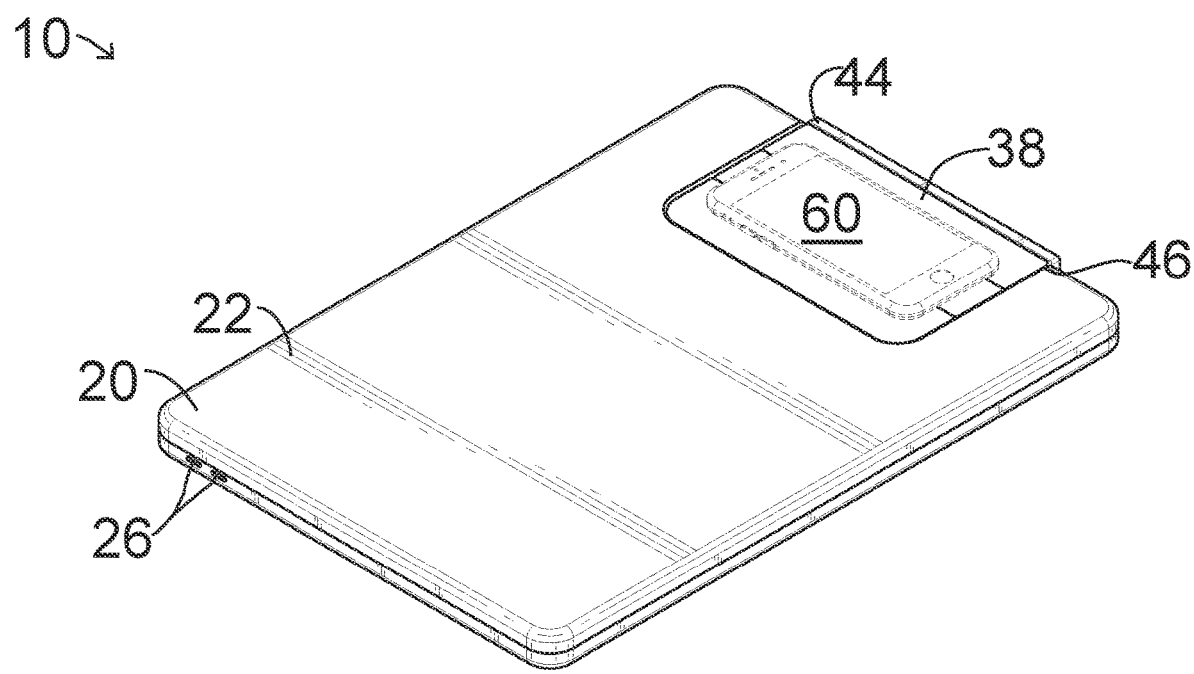
FIG. 8 is a perspective view as in FIG. 1, with the invention shown in use.
Figure 9:
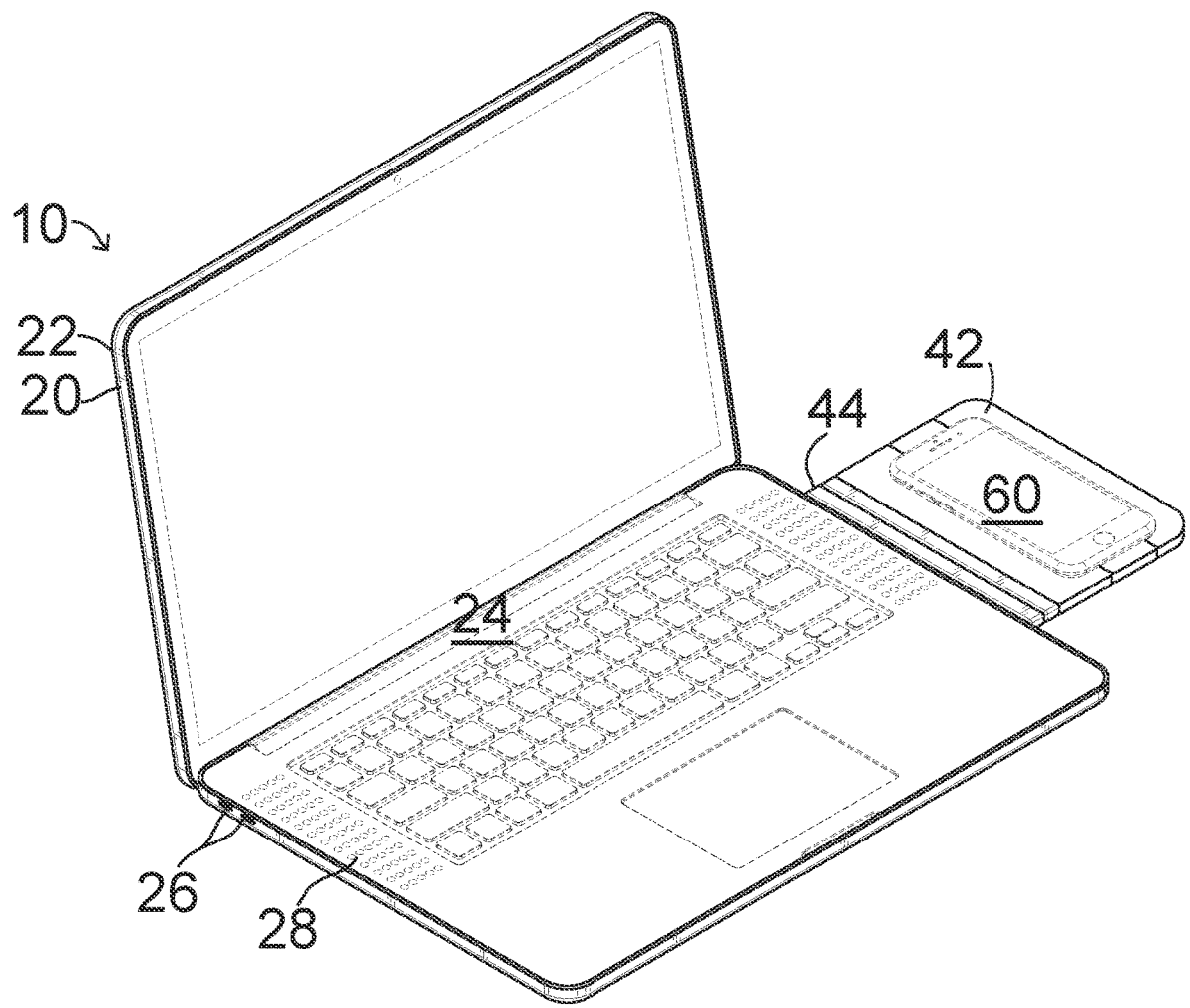
FIG. 9 is a perspective view of the invention shown in use with the laptop case open, and the charging pad in use (with a representative device to be charged thereon shown in phantom)
Figure 10:
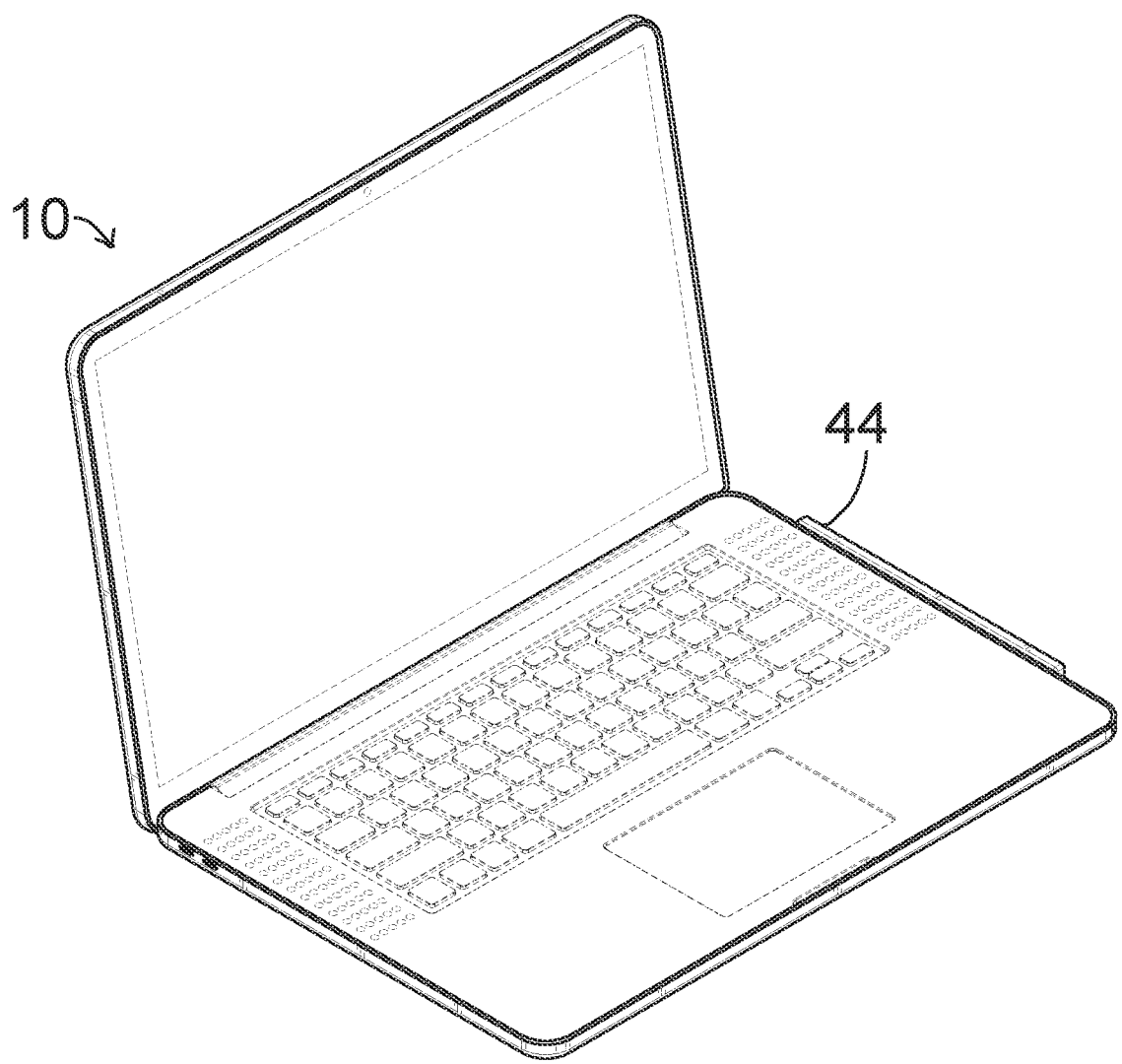
FIG. 10 is a perspective view of an alternative embodiment with the charging pad removed.

Referring to the Figures, FIG. 1 is a perspective view and FIG. 2 is a top plan view of the computer case wireless charging apparatus invention, shown generally at 10. FIG. 3 provides a bottom plan view of the invention. FIGS. 4, 5, 6, and 7 respectively provide left side, right side, front and rear views of the invention. FIG. 8 provides a perspective view of the invention shown in use, with a representative device to be charged on the charging pad shown in phantom. FIG. 9 provides a perspective view of the invention in use with the laptop case open, and the charging pad with a representative device to be charged thereon shown in phantom. FIG. 10 is a perspective view of an alternative embodiment of the apparatus.

The apparatus 10 includes a computer housing 20 having a notebook computer 22, a notebook computer battery 24 and USB ports 26; and a charging pad device 30 connected to the computer housing 20. The computer housing may comprise a laptop case which may contain any suitable laptop or notebook computer.

The charging pad device 30 includes a charging pad housing 32 and an inductive charging coil 34 (not shown) therewithin, capable of using a wireless connection or a wired connection, in order to use power from one USB-C or USB-A port on any desired laptop. A small PCB 28 is operably connected to the inductive charging coil 34, to the notebook computer battery 24 and to the USB ports 26 of the notebook computer. The charging device may comprise a wireless charger copper coil leading to small printed circuit board (PCB) with needed ports, USB-A, USB-C or the like. The PCB regulates the charge. The inductive charger is capable of charging small mobile devices wirelessly.

The charging pad housing 32 includes at least one charging surface for charging any wirelessly-chargeable device. In some embodiments, as seen at FIGS. 1-2 and 8, the charging pad housing includes a first charging surface 38. In this configuration it is also seen that the charging pad housing is located on top of the computer, holding it closed.

Some embodiments include a second charging surface 40 as seen at FIG. 3. In this configuration, it seen that the charging pad housing is folded beneath the computer and out of the way. However, if the computer is left on a surface upside-down, this surface may be capable of use in charging other devices placed thereupon.

As seen at FIG. 9, showing a perspective view of the invention in use with the laptop case open, some embodiments include a third charging surface 42, which may be used to charge while the computer is in use. A representative device to be charged thereon 60 is shown in phantom. Any suitable wirelessly-chargeable device may be charged thereon. Further, more than one device may be charged thereon at the same time.

The charging pad device 30 may be connected to the computer housing 20 by any suitable fixation element. The fixation element may be any suitable securement device made of any suitable material. The charging device may include a hinge 44 constructed and arranged to permit the charging pad device to fold open as seen at FIG. 9, and close over the computer housing (as seen at FIG. 8). The computer housing 20 may include a charging area 46 constructed and arranged to receive the charging pad housing 32. The charging device 30 may fold or pivot into the charging area 46 for use and storage, and may be folded or pivoted outward for use charging multiple wirelessly-chargeable electronic devices.

In some embodiments, the charging pad device 30 may be permanently connected to the computer housing 20. In some embodiments, the charging pad device 30 may be removably connected to the computer housing 20. The computer housing is shown at FIG. 10 with the charging pad device removed.

The laptop case may further comprise a charging area constructed and arranged to receive and retain an interior foldable charging device. The charging device may be foldable, or hinged and pivotally mounted to the housing. The wireless charging component or element may be located at any suitable location of the laptop or notebook computer. In some embodiments, the wireless charger may be removable.

In some embodiments, an optional soft outer protective sleeve 50 (not shown) may retain the computer housing. The outer cover or sleeve is constructed and arranged to removably receive the housing, and provide insulation and protection for the laptop computing device held therein. The outer cover or sleeve may be changed to provide an alternative ornamental appearance.

The apparatus and portions thereof may be made of any suitable material. Portions of the apparatus may be made of material including plastic materials, plastic polymers, polylactic acid (PLA), silicon, silicone rubber, and combinations thereof. In some embodiments, the computer housing may be made of an inexpensive durable material, such as, for example without limitation, polylactic acid (PLA), silicone rubber, or some other plastic polymer. The charging pad may be made of any suitable material, including silicone rubber, suede or felt. In some embodiments, the material covering the inductive charger is a flexible material capable of being folded around the computer housing as needed. The inductive charging coil may be made of copper. The fixation element or hinge may be of any suitable material. In some embodiments, the housing may be enclosed in an outer cover or sleeve made of any suitable or desired material, such as, for example without limitation, leather or suede.

In some embodiments, the apparatus is constructed and arranged for use by connecting a wirelessly chargeable device thereto, or placing the wirelessly chargeable device on the charging pad so that the wireless charging coil, inside the pad, may charge the wirelessly chargeable device. The apparatus may be used to charge any wirelessly-chargeable device, such as, for example without limitation, any desired smartphone or other wirelessly-chargeable device. The device may be used to charge without wires or plug-ins. In some embodiments, the charging device may comprise a plurality of sections. In some embodiments, the charging device may be removably secured to the housing. In some embodiments the charging device may be pivotally mounted to the housing, and may be used while located in the housing or folded out therefrom. The charging device may include three sections capable of being unfolded to provide additional surface area to charge more devices. The charging device may be used while completely folded, or while unfolded (either partially or completely). The charging device may be located in three locations, on top of the housing, and holding the laptop closed; to the side of the laptop while the laptop is in use; or beneath the laptop and out of the way.

As noted herein, the wireless charging device component or element may be located at any suitable location of the laptop or notebook computer. In some embodiments, the wireless charger may be removable.

In use, a user may enjoy a more convenient wireless charging station for a smartphone or any other wirelessly chargeable device. The user may beneficially use the combination of laptop and phone in daily life and mobility or during travel.

In an exemplary embodiment, the present invention provides a laptop or notebook computer case comprising a wireless charging pad. The charging pad is capable of use in charging all wireless charging devices, such as, for example without limitation, a phone, wireless earbuds or the like. The present invention provides an unprecedented laptop or notebook charging case.

The apparatus may be made by any suitable fabrication method. In some embodiments, 3D printing of all the components except electrical components is possible. The apparatus is constructed and arranged to be capable of holding a wireless charging component for devices. Some components may be optional and may be replaced or exchanged with other components which may provide a more efficient and better alternative. However the Copper wire is an essential feature to emit a wireless charging electromagnetic field.

The apparatus may be used with a laptop or notebook computer device, and may be charged while the computer is in use. The apparatus may be folded on top of computer while it is closed, or may be folded out of the way.

In summary, the present invention provides a computer case wireless charging apparatus for charging multiple wirelessly-chargeable external devices. The apparatus includes a computer housing having a notebook computer, a notebook computer battery and USB ports; and a charging pad device connected to the computer housing. The charging pad device includes a charging pad housing and an inductive charging coil therewithin. A small PCB is operably connected to the inductive charging coil, to the notebook computer battery and to the USB ports of the notebook computer. An optional soft outer protective sleeve may retain the computer housing. Portions of the apparatus may be made of material including plastic, polylactic acid (PLA), silicon and combinations thereof. The inductive charging coil may be made of copper. The charging pad housing includes at least one charging surface for charging any wirelessly-chargeable device. The notebook computer housing may include a charging area constructed and arranged to receive and retain the charging pad housing.

It should be understood, of course, that the foregoing relates to exemplary embodiments of the invention and that modifications, variations and changes in detail may be made without departing from the spirit and scope of the invention as set forth in the following claims.

What is claimed is:

1. A computer case wireless charging apparatus comprising:
   a computer housing having a notebook computer, a notebook computer battery and USB ports, contained therein;
   a charging pad device removably connected to the computer housing, the charging pad device comprising: a charging pad housing having a first charging surface and a second charging surface facing in an opposite direction as the first charging surface; and an inductive charging coil held within the charging pad housing
   a small printed circuit board (PCB) operably connected to the inductive charging coil, and operably connected to the notebook computer battery and the USB ports of the notebook computer,
   wherein the charging pad housing is pivotally mounted to the computer housing so that the charging pad is movable between a first position and a second position where, in the first position, the first charging surface is retained along a first charging area along an upper surface of the computer housing where, in the second position, the second charging surface is retained along a second charging area along a bottom surface of the computer housing.

2. The apparatus of claim 1 wherein at least a portion of the notebook computer housing and at least a portion of the charging pad housing are made of a material selected from plastic, polylactic acid (PLA), silicon and combinations thereof.

3. The apparatus of claim 1 wherein the inductive charging coil is made of copper.

4. The apparatus of claim 1 wherein the charging surfaces are made of a material selected from plastic, PLA, silicone rubber, fabric, and combinations thereof.

5. The apparatus of claim 1 wherein the charging pad is hingedly mounted to the notebook computer housing.

6. The apparatus of claim 5 wherein the charging device folds out from the first or second charging areas so as to occupy a third position spaced apart from the computer housing in a generally coplanar relationship thereto.

7. The apparatus of claim 1, further comprising a soft outer sleeve for retaining the notebook computer housing.

8. The apparatus of claim 7 wherein the outer sleeve is made of a material selected from fabrics, leather suede, felt, plastic, silicone rubber and combinations thereof.

9. The apparatus of claim 6, wherein the third position is spaced apart from the computer housing by a distance equal to a width of the hinge forming the hinged mounting.

* * * * *